(12) United States Patent
Kartikeya et al.

(10) Patent No.: US 12,321,251 B2
(45) Date of Patent: Jun. 3, 2025

(54) SYSTEM AND METHOD FOR PREDICTING REMAINING USEFUL LIFE OF A MACHINE COMPONENT

(71) Applicant: Eugenie AI Inc., Wilmington, DE (US)

(72) Inventors: Prashant Kartikeya, Hazaribagh (IN); Ramesh Kumar, Bangalore Rural (IN); Soudip Roy Chowdhury, Kolkata (IN)

(73) Assignee: Eugenie AI Inc., Wilmington, DE (US)

( * ) Notice: Subject to any disclaimer, the term of this patent is extended or adjusted under 35 U.S.C. 154(b) by 169 days.

(21) Appl. No.: 18/130,250

(22) Filed: Apr. 3, 2023

(65) Prior Publication Data

US 2023/0376398 A1 Nov. 23, 2023

Related U.S. Application Data

(63) Continuation-in-part of application No. 17/587,781, filed on Jan. 28, 2022, now Pat. No. 11,620,202, which is a continuation of application No. 17/369,849, filed on Jul. 7, 2021, now Pat. No. 11,269,752.

(30) Foreign Application Priority Data

May 25, 2021 (IN) .............................. 202121023322
Jul. 14, 2022 (IN) .............................. 202221040445

(51) Int. Cl.
| | | |
|---|---|---|
| G06F 11/00 | (2006.01) | |
| G06F 11/07 | (2006.01) | |
| G06F 11/30 | (2006.01) | |
| G06F 11/32 | (2006.01) | |
| G06F 18/214 | (2023.01) | |
| G06N 3/088 | (2023.01) | |

(52) U.S. Cl.
CPC ...... *G06F 11/3072* (2013.01); *G06F 11/0757* (2013.01); *G06F 11/0772* (2013.01); *G06F 11/3006* (2013.01); *G06F 11/327* (2013.01); *G06F 18/214* (2023.01); *G06N 3/088* (2013.01)

(58) Field of Classification Search
CPC .............. G06F 11/008; G06F 11/3466; G06F 11/328; G06F 11/3452; G06F 11/0766; G06F 11/3003; G06F 11/3089
See application file for complete search history.

(56) References Cited

U.S. PATENT DOCUMENTS

| | | | |
|---|---|---|---|
| 6,876,988 B2 | 4/2005 | Helsper et al. | |
| 7,016,825 B1 | 3/2006 | Tryon, III | |
| 8,781,982 B1 * | 7/2014 | Das ........................ | G06N 3/084 706/21 |
| 2010/0313072 A1 | 12/2010 | Suffern | |
| 2016/0116375 A1 | 4/2016 | Yamada et al. | |
| 2016/0253440 A1 * | 9/2016 | Iyengar ................... | G06F 30/20 703/2 |
| 2017/0006135 A1 | 1/2017 | Siebel et al. | |

(Continued)

*Primary Examiner* — Charles Ehne
(74) *Attorney, Agent, or Firm* — Wiley Rein LLP (57) ABSTRACT

Some embodiments are associated with a system and method for deep learning unsupervised remaining useful life (RUL) prediction in Internet of Things (IoT) sensor networks or manufacturing execution systems. The system and method use multilevel discrete wavelet for raw data transformation and a bidirectional long short-term memory (BiLSTM) based autoencoder neural network for RUL prediction.

10 Claims, 4 Drawing Sheets

(56) References Cited

U.S. PATENT DOCUMENTS

| | | |
|---|---|---|
| 2018/0173216 A1 | 6/2018 | Spiro et al. |
| 2019/0095781 A1* | 3/2019 | Vedula .................. G01H 17/00 |
| 2022/0067816 A1 | 3/2022 | Miyassi et al. |

* cited by examiner

SYSTEM AND METHOD FOR PREDICTING REMAINING USEFUL LIFE OF A MACHINE COMPONENT

RELATED APPLICATIONS

This application is a continuation-in-part application of U.S. patent application Ser. No. 17/587,781, filed Jan. 28, 2022, which is a continuation of U.S. patent application Ser. No. 17/369,849, filed Jul. 7, 2021, which claims priority benefit of Indian Patent Application No. 202221040445, filed Jul. 14, 2022 and Indian Patent Application No. 202121023322, filed May 25, 2021 NS, all of which are incorporated entirely by reference herein for all purposes.

FIELD

The invention relates to systems and methods in the field of computer science, and in particular to the use of deep learning architectures for predicting remaining useful life of complex industrial systems.

BACKGROUND ART

Remaining Useful Life (RUL) can be defined as the amount of time remaining before a machine asset goes through a failure or breakdown. The criteria for whether the machine/component has failed or is still usable is primarily known to the domain experts or the operational personnel in charge of maintenance. Estimating RUL based on component or system condition and health monitoring information is of prime importance in industrial operation research.

Accurate estimation of RUL in a machine can lead to more efficient use of the machine, less down time, and less faults. This, in turn, can lead to cost savings, avoidance of sudden breakdowns while in operation, and appropriate selection of installation or maintenance time. Thus, industries have long sought a method of predicting or estimating the RUL of various types of machines.

Predicting remaining useful life is not straightforward because, ordinarily, remaining useful life is conditional upon a variety of factors including future usage conditions. A common approach to predict RUL is to employ a data-driven approach to take advantage of time series data where equipment behavior has been tracked via Internet of Thing (IoT) sensor outputs during normal operation up until an end of equipment useful life. A regression model may be employed to estimate the parameters of a stochastic process and RUL is estimated based on the values of these parameters. The regression technique works well when the behavior of the dependent variables is regular (the usage is pretty much stable) and the variation is minor. However, the machines operate in various operational modes or conditions, and the presence of different types of failures on different sub-components of complex machines makes it difficult to predict the RUL accurately. As a result, prediction of anomalies in complex industrial machines or equipment by using IOT sensors data becomes an important but challenging task.

SUMMARY OF THE INVENTION

In view of the foregoing, the present invention provides a system and method for remaining useful life (RUL) prediction in complex industrial machines/equipment's by using IOT sensors data. One object of the present invention is to improve accuracy of RUL prediction via multilevel discrete wavelet data transformation in conjunction with a bidirectional long short-term memory based autoencoder deep learning architecture.

In view of the foregoing, the present disclosure provides systems and methods for predicting RUL for machines, machine components, equipment and the like. The systems and methods of the disclosure herein are useful in the diagnosis and prognosis of faults in machinery, machine components, industrial and agricultural equipment, fielded vehicles (tanks, helicopters, and the like), aircraft engines (both military and commercial), medical equipment, and power plants in real time to prevent impending failure.

In accordance with the present disclosure, the present disclosure herein provides a method for predicting the RUL of a machine component via a neural network predictive model. The method generally includes receiving time series data from a plurality of sensors or manufacturing execution system coupled to a machine or machine components. The time series data is pre-processed by normalization and transformation. In an example embodiment multilevel Discrete Wavelet Transform (DWT) is used to decompose a time series sequences from time domain to frequency domain at different levels of frequency. Thereafter, certain critical signatures/patterns are extracted which are not available in time series (time domain) and the extracted features are used to build a neural network predictive model. In an example embodiment, a bidirectional long short-term memory BiLSTM based autoencoder learning algorithm is employed for RUL prediction.

Another example embodiment of the disclosure includes a system for predicting the RUL of a machine component. In certain embodiments, the RUL prediction system comprises data services, a model training and deployment service, and a user interface service. In some aspects, the RUL prediction system employs a microservice architecture to loosely couple a plurality of services. Individual service communicates with one another over a network to fulfill a goal using technology-agnostic protocols. A data service is configured to receive time series data from a plurality of sensors or manufacturing execution system coupled to a machine. A data pre-processing service is in signal communication with the data service. A model training and deployment service comprises at least one neural network model executed on a processor for performing training and RUL predicting. In other embodiments, the model training and deployment service comprises a RUL calculator and an evidence miner service that queries data from the distributed database and persist the learned-model in the Model versions database. In an example embodiment, the RUL calculator employs a BiLSTM based autoencoder learning model for RUL prediction.

Additional features and advantages of the disclosure will be set forth in the detailed description which follows, and in part will be readily apparent to those skilled in the art from that description or recognized by practicing the disclosure as described herein, including the detailed description which follows, the claims, as well as the appended drawings.

BRIEF DESCRIPTION OF THE DRAWINGS

The invention will be described in more detail below on the basis of one or more drawings, which illustrates exemplary embodiments.

DETAILED DESCRIPTION OF THE EMBODIMENTS

It should be understood that this invention is not limited to the particular methodology, protocols, and systems, etc., described herein and as such may vary. The terminology used herein is for the purpose of describing particular embodiments only and is not intended to limit the scope of the present invention, which is defined solely by the claims.

As used in the specification and appended claims, unless specified to the contrary, the following terms have the meaning indicated below.

"Anomaly" refers to data points which do not conform to an expected pattern of the other items in the data set.

"Outliers" refer to a rare chance of occurrence within a given data set. In Data Science, an Outlier is an observation point which is distant from other observations. An Outlier may be due to variability in the measurement or it may indicate experimental error.

"Deep learning" refers to a subfield of machine learning concerned with algorithms inspired by the structure and function of the brain called artificial neural networks.

"Natural language generation (NLG)" refers to the use of artificial intelligence (AI) programming to produce written or spoken narrative from a dataset.

"Unsupervised machine learning (ML)" refers to unsupervised machine learning algorithms that gather patterns from a dataset without reference to known, or labelled outcomes.

"Kafka" is a message queue reimaged as a distributed commit log. Messages are not deleted when consumed but are all kept on the broker (like a log file keeps line items one after another).

"Mode" refers to a statistical term that refers to the most frequently occurring number found in a set of number.

"Max voting" refers to an ensemble method used for classification problems. In this technique, multiple models are used to make predictions for each data point. The predictions by each model are considered as a 'vote'. The predictions from the majority of the models are used as the final prediction.

"Stacking" is an ensemble learning technique that uses predictions from multiple models to build a new model. This model is used for making predictions on the test set.

"Blending" follows the same approach as stacking but uses only a holdout (validation) set from the train set to make predictions. In other words, unlike stacking, the predictions are made on the holdout set only. The holdout set and the predictions are used to build a model which is run on the test set.

"Bagging" is combining the results of multiple models to get a generalized result.

"Boosting" is an iterative technique which adjusts the weight of an observation based on the last classification. If an observation was classified incorrectly, it tries to increase the weight of this observation and vice versa.

"Time series data", also referred to as time-stamped data, is a sequence of data points indexed in time order. Time-stamped is data collected at different points in time. These data points typically consist of successive measurements made from the same source over a time interval and are used to track change over time "Data stream" refers to a sequence of digitally encoded coherent signals used to transmit or receive information that is in the process of being transmitted. A data stream is a set of extracted information from a data provider.

"Hypertext Transfer Protocol (HTTP)" is an application layer protocol for distributed, collaborative, hypermedia information systems. HTTP is the foundation of data communication for the World Wide Web, where hypertext documents include hyperlinks to other resources that the user can easily access, for example by a mouse click or by tapping the screen in a web browser.

"Message Queuing Telemetry Transport (MQTT)" is a lightweight, publish-subscribe network protocol that transports messages between devices. The protocol usually runs over TCP/IP; however, any network protocol that provides ordered, lossless, bi-directional connections can support MQTT. It is designed for connections with remote locations where a "small code footprint" is required or the network bandwidth is limited. The protocol is an open OASIS standard and an ISO recommendation (ISO/IEC 20922).

"Modbus" is a data communications protocol originally published by Modicon (now Schneider Electric) in 1979 for use with its programmable logic controllers (PLCs). Modbus has become a de facto standard communication protocol and is now a commonly available means of connecting industrial electronic devices.

"Zigbee" is an IEEE 802.15.4-based specification for a suite of high-level communication protocols used to create personal area networks with small, low-power digital radios, such as for home automation, medical device data collection, and other low-power low-bandwidth needs, designed for small scale projects which need wireless connection. Hence, Zigbee is a low-power, low data rate, and close proximity (i.e., personal area) wireless ad hoc network.

"Principal component analysis (PCA)" is the process of computing the principal components and using them to perform a change of basis on the data, sometimes using only the first few principal components and ignoring the rest. PCA is used in exploratory data analysis and for making predictive models. It is commonly used for dimensionality reduction by projecting each data point onto only the first few principal components to obtain lower-dimensional data while preserving as much of the data's variation as possible.

"Independent component analysis (ICA)" is a computational method for separating a multivariate signal into additive subcomponents. This is done by assuming that the subcomponents are non-Gaussian signals and that they are statistically independent from each other. ICA is a special case of blind source separation.

"Kernel principal component analysis (kernel PCA)" is an extension of principal component analysis (PCA) using techniques of kernel methods. Using a kernel, the originally linear operations of PCA are performed in a reproducing kernel Hilbert space.

"Long short-term memory (LSTM)" is an artificial neural network used in the fields of artificial intelligence and deep learning. Unlike standard feedforward neural networks, LSTM has feedback connections. It is a variety of recurrent neural networks (RNNs) that are capable of learning long-term dependencies, especially in sequence prediction problems.

"Sparse principal component analysis (sparse PCA)" is a specialized technique used in statistical analysis and, in particular, in the analysis of multivariate data sets. It extends the classic method of principal component analysis (PCA) for the reduction of dimensionality of data by introducing sparsity structures to the input variables.

"Discrete wavelet transform (DWT)" is any wavelet transform for which the wavelets are discretely sampled. As with other wavelet transforms, a key advantage it has over Fourier transforms is temporal resolution: it captures both frequency and location information (location in time).

"Mean Squared Error (MSE)" is the sum of the squared differences between the prediction and true value. The output is a single number representing the cost.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments.

Figure 1:
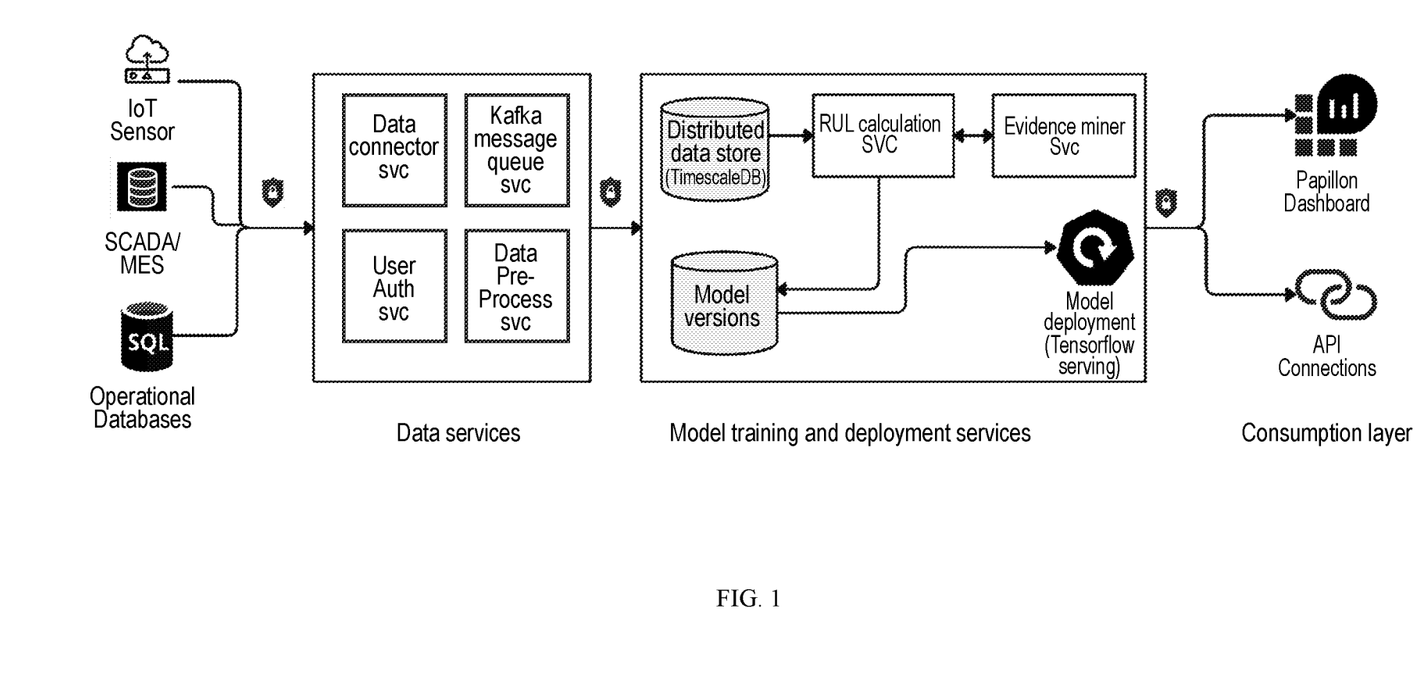
FIG. 1 depicts a general schematic of the system architecture.

As illustrated in FIG. 1, the present RUL prediction system 100 comprises data services 110, a model training and deployment service 120, and a user interface service 130. The RUL prediction system employs a microservice architecture to loosely couple a plurality of services. Individual service communicates with one another over a network to fulfill a goal using technology-agnostic protocols such as HTTP.

The data services support both stream and batch data coming from the sensors that are fitted onto a machine or from other manufacturing execution systems. The present system supports secured data ingestion over different IoT communication protocols including HTTPS, MQTT, Modbus, Zigbee, and the like. The data for RUL prediction is time series data. Data includes a timestamp, a set of sensor readings collected at the same time as timestamps, and device identifiers. The goal of RUL prediction is to predict at the time "t", using the data up to that time, whether the equipment will fail in the near future.

In some embodiments, the data services comprise a data connector service, a kafka message queue service, a user authorization service and a data pre-processing service.

The data pre-processing service is configured for data preparation. The data pre-processing service may include, but is not limited to, a data normalization module and a data transformation module.

In a normal operational setting, data comes from a lot of resources and also can correspond to different parameters. Each of these parameters will have numerical values in a completely different range. Therefore, there is a need of normalizing the data before building any data-driven solution. This normalization approaches may include, but be not limited to, min-max normalization, standard normalization and normalization based on clustering.

In min-max normalization, minimum and maximum value of each sensor in the time-series data is used for normalizing the data. If there are m sensors in the time-series data and if $$x = \begin{bmatrix} x_1 \\ x_2 \\ x_3 \\ \vdots \\ x_m \end{bmatrix},$$

denotes one of the vector representing an observation from different sensors, then the normalized vector is given by $X_{norm}$, where, $$x_{norm} = \begin{bmatrix} \frac{x_1 + x_{1,min}}{x_{1,max} - x_{1,min}} \\ \frac{x_2 - x_{2,min}}{x_{2,max} - x_{2,min}} \\ \frac{x_3 - x_{3,min}}{x_{3,max} - x_{3,min}} \\ \vdots \\ \frac{x_m - x_{m,min}}{x_{m,max} - x_{m,min}} \end{bmatrix}$$

$X_{i,max}$ and $X_{i,min}$ are the maximum and minimum values of the $i^{th}$ sensor in the training data. (Note: $i \in 1, 2, 3, \ldots, m$)

In standard normalization, mean and the standard deviation of each sensor value in the training dataset is used for normalization. If $\mu_i$ & $\sigma_i$ are the mean and standard deviation of the $i^{th}$ sensor in the data set then the normalized value is given by, $$x_{norm} = \begin{bmatrix} \frac{x_1 - \mu_1}{\sigma_1} \\ \frac{x_2 - \mu_2}{\sigma_2} \\ \frac{x_3 - \mu_3}{\sigma_3} \\ \vdots \\ \frac{x_m - \mu_m}{\sigma_m} \end{bmatrix}$$

In certain data-sets it is more meaningful to find that in which operating condition is machine operating before applying normalization. Clustering based on spatial distribution of the sensor values can be one of the methods to find out these operating conditions in the dataset. In such a case statistics of the cluster are used for normalizing the data. Data is divided into cluster with similar values. New normalized metrics are introduced such that the average contributions of all attributes to the measures are equal to each other from a statistical point of view. For statistical treatment of vector variables, namely the feature vectors, one needs to know the probability distributions of their attributes. For a numerical attribute, the probability distribution identifies the probability of the attribute value falling within a particular interval within the range of possible values. It is shown that the accuracy usually increases when clustering is performed using normalized metrics.

If at a given instance the observation belongs to a cluster-j, then the mean ($\sigma_{ij}$) and standard deviation ($\sigma_{ij}$) of the $i^{th}$ sensor within the $j^{th}$ cluster is used for normalization. In this case the normalized vector then becomes, $$x_{norm} = \begin{bmatrix} \frac{x_1 - \mu_{1j}}{\sigma_{1j}} \\ \frac{x_2 - \mu_{2j}}{\sigma_{2j}} \\ \frac{x_3 - \mu_{3j}}{\sigma_{3j}} \\ \vdots \\ \frac{x_m - \mu_{mj}}{\sigma_{mj}} \end{bmatrix}$$

The normalized data is transmitted to a data transformation module to obtain transformed sub-sequences. In some embodiments, once the normalization is done then the sub-sequences are obtained from the normalized data the length/of the sub-sequences may be kept equal to 128.

In one embodiment, the normalized data can be transformed via Fourier coefficients by applying DFT algorithm on each column of the sub-sequence. For an N-point sequence the DFT coefficients can be obtained as $$\begin{bmatrix} \hat{X}_1 \\ \hat{X}_2 \\ \hat{X}_3 \\ \hat{X}_4 \\ \vdots \\ \hat{X}_N \end{bmatrix} = W \begin{bmatrix} X_1 \\ X_2 \\ X_3 \\ X_4 \\ \vdots \\ X_N \end{bmatrix}$$

Where, $$W = \frac{1}{\sqrt{N}} \begin{bmatrix} 1 & 1 & 1 & 1 & \cdots & 1 \\ 1 & \omega & \omega^2 & \omega^3 & \cdots & \omega^{(N-1)} \\ 1 & \omega^2 & \omega^4 & \omega^6 & \cdots & \omega^{2(N-1)} \\ 1 & \omega^3 & \omega^6 & \omega^9 & \cdots & \omega^{3(N-1)} \\ 1 & \omega^4 & \omega^8 & \omega^{12} & \cdots & \omega^{4(N-1)} \\ \vdots & & & & & \\ 1 & \omega^{(N-1)} & \omega^{2(N-1)} & \omega^{3(N-1)} & \cdots & \omega^{(N-1)(N-1)} \end{bmatrix}$$

where, $\omega = e^{2\pi/N}$ and $i = \sqrt{\sqrt{-1}}$. The DFT coefficients are symmetric around the index N/2 so for the case of Fourier features real and complex parts of the first N/2 coefficients are used as a feature vector in place of raw sensor values. These coefficients provide information regarding the phase and magnitude of various sinusoids that are used to synthesize the sub-sequences and might provide better representation of the data leading upto the failure.

In one embodiment, the normalized data can be transformed via discrete wavelet transform (DWT). Popular DWT includes, but is not limited to, the Haar-2, Daubechies-4, Daubechies-6 transforms, and double-tree complex wavelet transform. The general procedure for applying a discrete wavelet transform uses a hierarchical pyramid algorithm that halves the data at each iteration, resulting in fast computational speed.

In another embodiment, a multilevel DWT may be applied to the normalized time-series data. Multilevel DWT can decompose a time series sequences from time domain to frequency domain at different levels of frequency, which is crucial for capturing frequency factors for deep learning. All parameters in multilevel DWT can be fine-turned to fit training data of different learning tasks. In other words, multilevel DWT can take advantages of both wavelet based time series decomposition and the learning ability of deep neural networks. For obtaining the wavelet-based features, a multilevel DWT of all the columns in sub-sequence is obtained. At each level j of the decomposition, one can get an approximation of the data at j denoted by the sequence $a_j$, known as approximation coefficients. It is assumed that at scale j=0, $a_0[n] \sim X_n$, $n \in \{1, 2, \ldots, N\}$, where $a_0[n]$ represents the finest approximation of the data. However, the sequence of coefficients $a_j$, for j>0 represent coarser approximation of the data. The information lost between any two consecutive approximations of the data is represented by a set of detail coefficients $d_j$. Accordingly, for j>0 we have $$a_{j+1}[n] = \sum_{k=-\infty}^{\infty} h[2n-k]a_j[k]$$

$$d_{j+1}[n] = \sum_{k=-\infty}^{\infty} g[2n-k]a_j[k]$$

Here, h[n] and g[n] are quadrature mirror (wavelet) filters (QMF) related to each other via $g[n] = (-1)^n h[1-n]$. These coefficients are the optimum features extracted from the signal at different scales and can be used as new features to train a deep neural network.

In some embodiments, the data pre-processing service removes the failed state from the data as part of the data preparation step. The data pre-processing service uses a feature engineering script to prepare the sensors' data such that the model can learn leading signals for future warning states. The data pre-processing service is configured to characterize the sensors' time series data by a state, wherein the states include at least one of the following: a failed state which characterizes situations that are problematic or inoperational; a warning state which characterizes situations that lead up to a failure; and a normal state which characterizes all other situations. For example, label 0 represents the normal functioning machinery (normal state); label 1 represents that the machine is in failing condition (or about to fail in 7 days) (warning state); lastly, Label 2 represents that machine is not operational (failed state). Accordingly, the data pre-processing service removes the failed state of the machine from the applicable dataset of normal, warning and failed state data. Thus, the deep learning model learns patterns from the normal and/or warning behavior of machines, unlike the traditional methods that learn from the anomaly data, which is a salient feature of the present invention. Understandably, if the machine does not have a failed sate data yet, it would still be able to predict failure. The model will raise failure alarms or warning when time-series data fall into the warning state. Thus, the proactiveness of the RUL prediction system can be adjusted by training the prediction model using different pre-failure normal and warning intervals.

In some embodiments, the model training and deployment service receives and stores the pre-processed data in a distributed database, such as TimescaleDB. The model training and deployment service may employ a regression approach to predict when the failure will happen. The RUL calculator is configured to calculate how much time is left before the next failure. While predicting RUL, the goal is to reduce the error between the actual RUL and the predicted RUL.

The RUL calculator and evidence miner service are configured to query data from the distributed database and persist the learned-model in the Model versions database. This stored or queried data will be used in the building and training of a neural network predictive model. The neural network may be chosen from, but not limited to, LSTM, CNN, Bi-LSTM, which may be developed by training it to accurately map process inputs onto process outputs based upon measured or existing process data. In one example embodiment, the input data may be based upon the wear of a machine component that has contact with another surface, where the "wear" or wear pattern can affect the performance of the machinery.

In some embodiments, the RUL calculator employs a long short-term memory (LSTM) model for predicting the RUL. In this architecture, at time t, a LSTM takes in a multivariate sequence as an input and outputs an estimated RUL. This model is composed of multiple layers of LSTM followed by fully connected multiple feed forward neural networks. LSTMs are good at modelling temporal sequences. Features derived from the LSTM layer can be used by fully connected neural network to map these features to RUL model. In one embodiment, the LSTM network comprises two hidden LSTM units having 64 neurons each. These LSTM layers are followed by fully connected feed for-ward hidden layers having 8 neurons each. this network is trained using the mean-squared error cost function given by:

$$J = \frac{1}{N_b} \sum_t (y_t + \hat{y}_t)^2$$

here $N_b$ is the number of training samples in a batch $y_t$ is the actual RUL and $\hat{y}_t$ is the predicted RUL. This cost function is minimized using the Adam (Adaptive Moment Estimation) optimization algorithm. Adam optimization algorithm is an optimization algorithm that can be used instead of the classical stochastic gradient descent procedure to update network weights iterative based in training data. This algorithm calculates the exponential moving average of gradients and square gradients.

In some embodiments, the RUL calculator may employ a CNN model. In 2-D CNN, convolutional layers convolve multiple filters with raw input data and generate features. This is followed by pooling layers they extract the most significant local features afterwards. In one embodiment, the size of convolution kernel is 128×4 while the size of maxpool layer is 1×2 in the second Convolution layer has the kernel of size 1×3 while the size of maxpool layer is kept constant. The feature after the second layer is flattened and connected to a fully connected layer with 8 neurons which is further connected to a single neuron in the output that gives the estimation for RUL. The network is trained for a cost function using the above equation.

In some embodiments, the RUL calculator may employ a bidirectional LSTM based autoencoder architecture for predicting RUL. A bidirectional LSTM, or BiLSTM, is a sequence processing model that consists of two LSTMs: one taking the input in a forward direction, and the other in a backwards direction. In other words, BiLSTMs maintain two groups of hidden layers, one for input sequences in the positive time direction (forward states), and the other for input sequences in the negative time direction (backward states). BiLSTMs effectively increase the amount of information available to the network, improving the context available to the algorithm. An autoencoder is a type of neural network used to learn efficient code (embedding) in an unsupervised manner. Thus, the autoencoder architecture is an unsupervised way of representing the data in a higher dimensional space to a lower dimensional embedding. The aim of the autoencoder architecture is to perfectly reconstruct the higher dimensional input. An autoencoder consists of an encoder and decoder. The encoder learns to compress the input data into a short code, whereas the decoder learns to un-compress the code into a set of data that closely matches the input data. The compress representation can be used as an input by a fully connected feed-forward neural network to map this information to an RUL value. The feed-forward network approximates a certain function y=f(x) to map an input x to a value y. The problem of estimating RUL can be formalized as a regression problem. Deep neural networks can be used as a functional approximation for this problem. If f is the function representation for this regression problem then, $$f: \mathcal{R}^{l \times m} \to \mathcal{R}$$
$$RUL = f(X)$$

Here, X is, $$X = \begin{bmatrix} X_{i1} & X_{i2} & \cdots & X_{im} \\ X_{(i+1)1} & X_{(i+1)2} & \cdots & X_{(i+1)m} \\ \vdots & & & \\ X_{(i+l-1)1} & X_{(i+l-1)2} & \cdots & X_{(i+l-1)m} \end{bmatrix}$$

the sub-sequence of the time-series data, Z is the length of the sub-sequence, m is the number of sensors in the sub-sequence and i=1, 2, . . . , (L−l)+1, where L is the total length of the time-series. This sub-sequence window keep sliding along the temporal dimension to generate the inputs for the deep-neural network.

In some embodiments, Bi-LSTM based autoencoder architecture is used along with various engineered features (Fourier transformed and wavelet versions) to understand the effect on the accuracy of RUL predictions. In Bi-LSTM based autoencoder architecture, both encoder and decoder have one hidden layer with 50 and 200 hidden neurons respectively. The encoded information is passed through the fully connected feed forward network with 50 hidden neurons and one hidden layer. This is connected to the output layer to map this 50-Dimensional feature to the RUL value. During training mean squared error (MSE) is employed as the cost function for improving the reconstruction performance of the autoencoder. Autoencoders are trained by adjusting weights and biases to minimize the cost function. The MSE cost function is also employed to improve the accuracy of RUL estimation.

In another embodiment, the RUL calculator employs an unsupervised predictive GAN model with multi-layer perceptrons (MLP) as generator and discriminator (MLP-MLP GAN). The predictive MLP-MLP GAN model is trained to generate predicted feature values (e.g. data points) associate with a time series given corresponding values (e.g., data points) of at least one other time series based on prior behavior of the multiple time series. A risk score or probability of next failure occurring within a period ranging from 1 day to 30 days or more is generated based on identifying deviations between the predicted values and actual values associated with the multiple time series. In a standard GAN framework, the parameters of D and G are updated based on the outputs of D, so that the discriminator can be trained to be as sensitive as possible to assign correct labels to both real and fake sequences, while the generator will be trained to be as smart as possible to fool the discriminator (i.e. to mislead D to assign real labels to fake sequences) after sufficient rounds of iterations. By being able to generate realistic samples, the generator G will have captured the hidden multivariate distributions of the training sequences and can be viewed as an implicit model of the system at normal status. At the same time, the resulting discriminator D has also been trained to be able to distinguish fake (i.e. abnormal) data from real (i.e. normal) data with high sensitivity.

Once the model is deployed, it calculates the RUL and/or the risk score of a machine on incoming stream or batch data. The output of the predictive models is stored in another table in the database. During inference, first the cluster corresponding to the m-dimensional vector of sensor information (from the test data) is estimated. Using this cluster and the statistics of the sensor values within this cluster, the data is normalized. This process has to be repeated for every sensor information till the enough sensor data is available to form the window of length l. The resulting data is a 2-D tensor of dimension l×m. Then for each column, transformation such as Fourier or wavelet-based features are calculated. These 2-D tensors can be directly fed as an input to a neural network based architecture.

Figure 2:
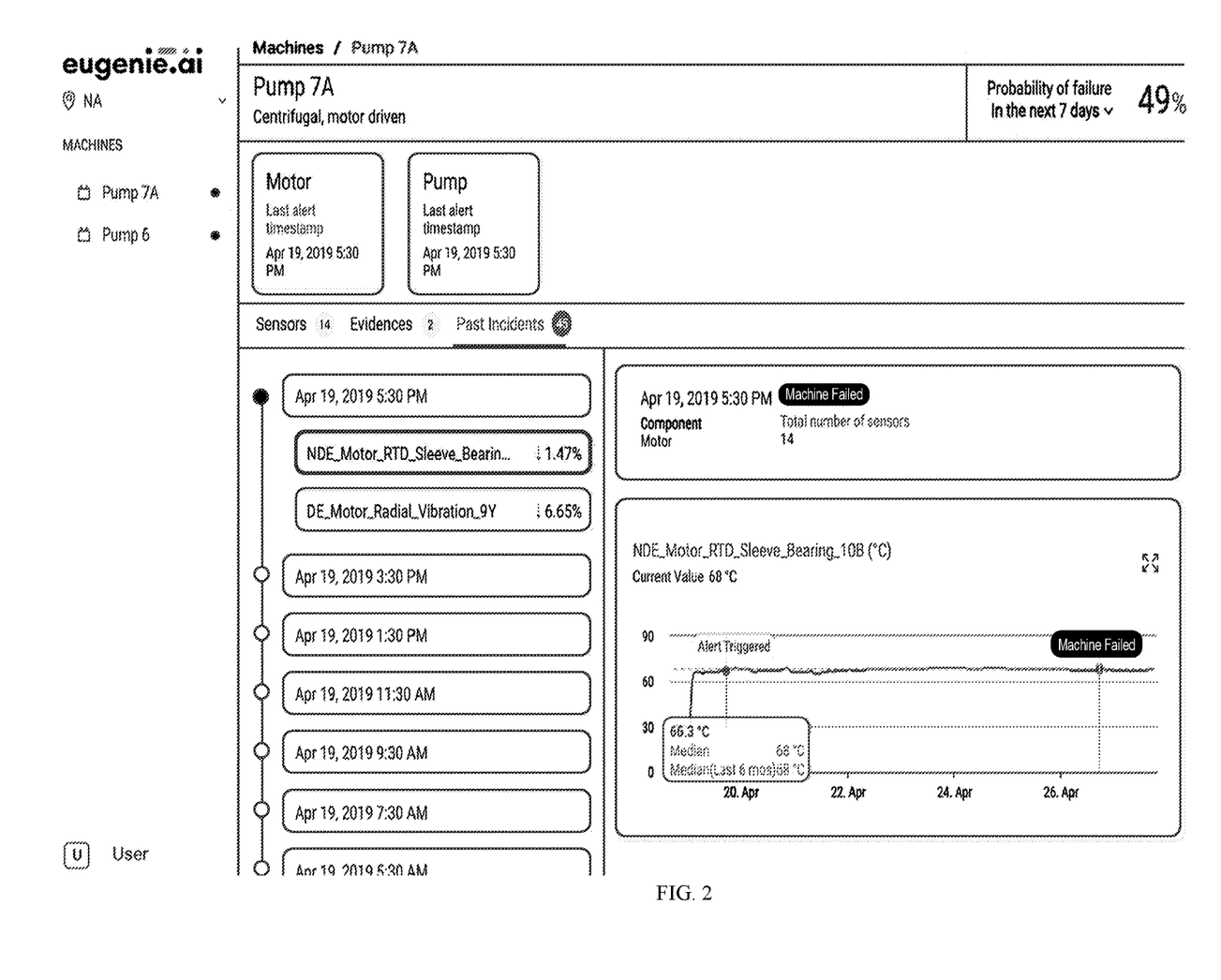
FIG. 2 depicts an exemplary of the operational intelligence dashboard.

The user interface service or consumption platform of the present system reads the output of the predictive model from the database and visualizes them on the dashboard in the form of insights, along with supporting evidence. FIG. 2 is an exemplary of the operational intelligence dashboard.

Figure 3:
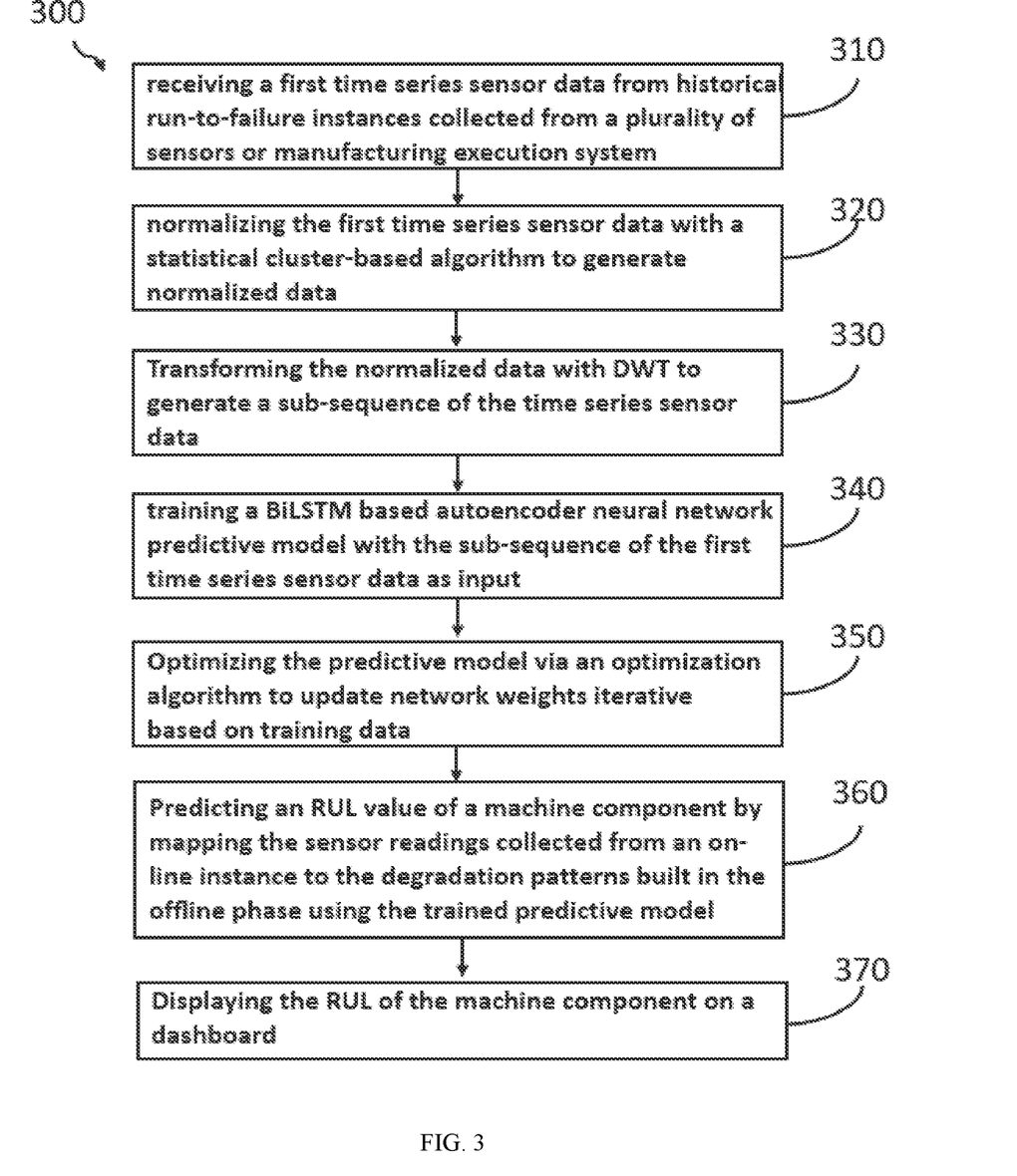
FIG. 3 depicts an embodiment of a generalized flowchart of an example method of predicting the RUL of a machine component.

Turning to FIG. 3, an embodiment of a generalized flowchart 300 of an example method of predicting the RUL of a machine component is depicted. In this embodiment, the method may begin with 310 receiving a first time series data from historical run-to-failure instances collected from a plurality of sensors or manufacturing execution system coupled to a machine or machine components. At step 320, the first time series data is pre-processed by normalization with a statistical cluster-based algorithm to generate normalized data. At step 330, the normalized data is then transformed with multilevel discrete wavelet transform (DWT) to generate a sub-sequence of the first time series sensor data. At step 340, the sub-sequence of the first time series sensor data is subsequently used as input to train a BiLSTM based autoencoder neural network predictive model for predicting the remaining useful life of the machine. The model is trained in an unsupervised way to convert the multi-sensor (high-dimensional) readings collected from historical run-to-failure instances (i.e. multiple units of the same system) to low-dimensional embeddings. At step 350, once the predictive model is built, the predictive model is optimized via an optimization algorithm to update network weights iterative based on training data. At step 360, an RUL value of a machine component is predicted by mapping the sensor readings collected from an on-line instance to the degradation patterns built in the offline phase using the trained predictive model, from which the RUL of the test unit can be estimated at an early stage. At step 370, the RUL value of a machine component is displayed.

It is to be understood that the above described embodiments are merely illustrative of numerous and varied other embodiments which may constitute applications of the principles of the invention. Such other embodiments may be readily devised by those skilled in the art without departing from the spirit or scope of this invention and it is our intent they be deemed within the scope of our invention.

EXAMPLES

Example 1. Evaluation of the Present System with NASA-CMAPSS Data Sets

NASA-CMAPSS (Commercial Modular Aero-Propulsion System Simulation) data-set is used to evaluate the present invention. CMAPPS dataset includes sensor data with different number of operating conditions and fault conditions. This data has four sub-data-sets with different number of operating conditions and fault conditions and each sub-data-set is further divided into training and test subsets. Each row in the data is a snapshot of data taken during a single operating time cycle, which includes 26 columns: the 1st column represents engine ID, the 2nd column represents the current operational cycle number, the 3rd-5th columns are the three operational settings that have a substantial effect on engine performance, the 6th-26th columns represent the 21 sensor values. The engine is operating normally at the start of each time series, and develops a fault at some point in time which is unknown. In the training set, the fault grows in magnitude until a system failure. In the test set, data is provided up to some time prior to system failure. The goal is to estimate the number of remaining operational cycles before failure on the test data.

Each sub-data-set (FD001, FD002, FD003, FD004) contains data corresponding to 100 (FD001, FD003) and 250 (FD002, FD004) engines in the test data-set. Each data set is subject to different combination of data transformation and neural network architectures as listed in FIG. 4. MAE (mean of absolute error) is calculated for each engine in the test data. Then, a mean MAE (MMAE) is calculated across all the engine by using $$MMAE = \frac{1}{N_E}\sum_{i=1}^{N_E}\left\{\frac{1}{N_C}\sum_{j=1}^{N_C}\left|RUL^i_{j_{act}} - RUL^i_{j_{pred}}\right|\right\}$$

Figure 4:
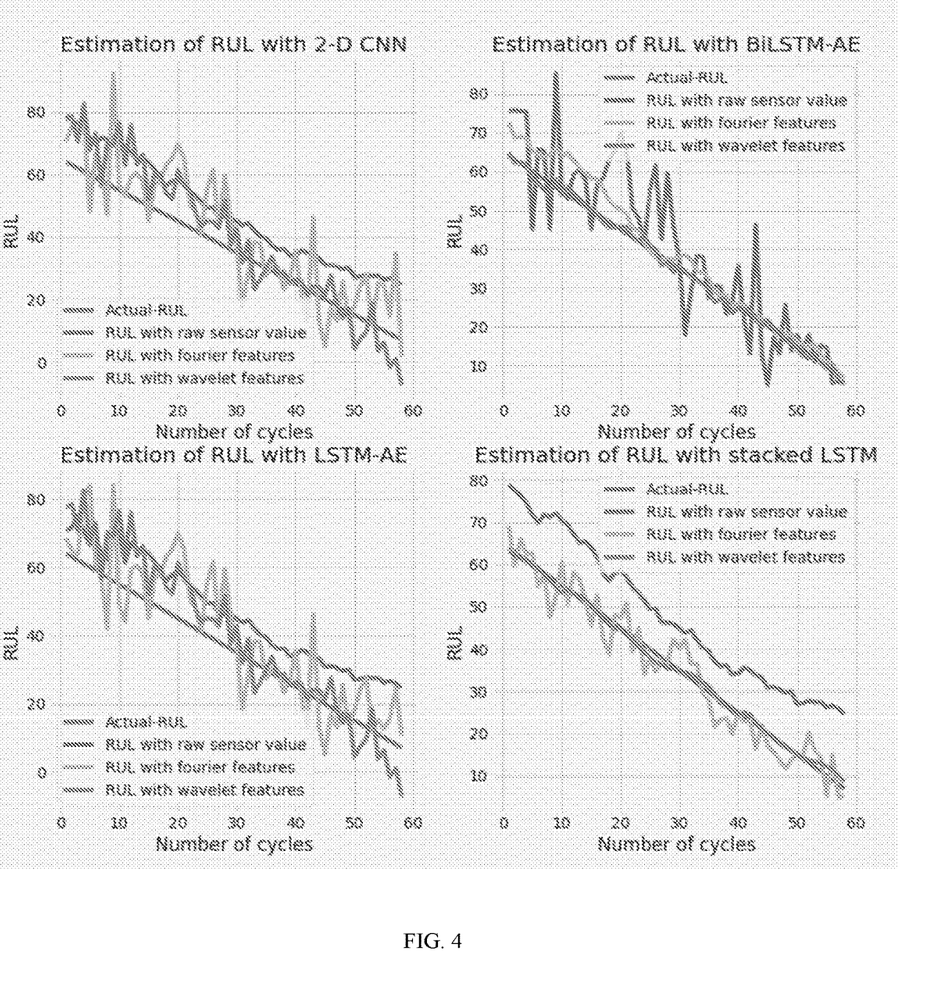
FIG. 4 shows the results of estimation of RUL for one of the engines in the test set of the data-set FD001.

Here, $N_C$ is the total number of cycle in the $i^{th}$ engine and $N_E$ is the total number of engine in the test data-set. $RUL_{j_{act}}{}^i$ is the actual RUL for the $i^{th}$ engine, corresponding to the $j^{th}$ cycle and $RUL_{j_{pred}}$ is the predicted RUL for the $i^{th}$ engine, corresponding to the $j^{th}$ cycle.

FIG. 4 shows the results of estimation of RUL for one of the engines in the test set of the data-set FD001. From the results, it is evident that when wavelet based features are used as an input to the deep neural networks the accuracy of estimation is best. This result is consistent with all the engines in the test data of FD001, FD002, FD003 and FD004. The same is not true for Fourier transform based features. The main reason for this can be attributed to the fact that Fourier transforms provide exact dominant periods in the data but the time of occurrence of these dominant features is lost as the basis function for transforming a temporal function into Fourier domain are complex exponential which are unbounded in time (or natural) domain.

This problem is mitigated by using multilevel DWT. The detail coefficients obtained from DWT are stationary or covariance stationary and on a high value whenever there is a sudden change (which translates to injection of sudden high frequency sinusoids in the data) between the consecutive samples of the sequence. The type and order of wavelet filter is decided by the error of reconstruction when the signal is reconstructed using DWT coefficients.

Table 1 shows the results of experiments for other data-sets. Best results are obtained when wavelet transforms are used in conjunction with Bi-LSTM-based autoencoders because compared with the unidirectional stacked LSTM networks and unidirectional LSTM based autoencoders, the bidirectional ones can learn more robust embeddings by increasing the amount of input information to the neural networks. BiLSTMs maintain two groups of hidden layers, one for input sequences in the positive time direction (forward states), and the other for input sequences in the negative time direction (backward states). By this special structure, BiLSTMs are able to capture the time dependencies within a sequence in a forward and a backward manner.

TABLE 1

RUL estimation results for different deep-learning architectures along with different engineered features.

| Deep Learning-Architecture | FD001 (MMAE) | FD002 (MMAE) | FD003 (MMAE) | FD004 (MMAE) |
|---|---|---|---|---|
| AE(LSTM) + FNN | 29.8 | 32.43 | 26.67 | 28.67 |
| AE(LSTM) + FNN(Fourier) | 29.72 | 27.71 | 38.43 | 29.43 |
| AE(LSTM) + FNN(Wavelet) | 28.34 | 26.43 | 23.76 | 27.01 |
| AE(BILSTM) + FNN | 28.94 | 29.06 | 34.54 | 33.43 |
| AE(BILSTM) + FNN(Fourier) | 27.45 | 30.76 | 27.89 | 32.67 |
| AE(BILSTM) + FNN(Wavelet) | 25.23 | 21.45 | 22.21 | 26.34 |
| LSTM + FNN | 26.33 | 24.11 | 36.32 | 28.43 |
| LSTM + FNN(Fourier) | 25.23 | 21.45 | 26.07 | 22.32 |
| LSTM + FINN(Wavelet) | 24.32 | 22.31 | 24.89 | 21.23 |
| CNN | 28.16 | 30.21 | 29.41 | 29.11 |
| CNN (Fourier) | 27.98 | 38.72 | 27.84 | 29.45 |
| CNN(Wavelet) | 24.34 | 29.02 | 27.45 | 28.67 |

It has been shown that when multilevel DWT is used to decompose the sequences and these transformed sub-sequences are used as an input to all the deep learning architectures, then the accuracy improves significantly. This happens because wavelets detrend the sequences at different temporal scales and the sudden changes in the sequence values can be easily seen by observing the detail coefficients in a multilevel DWT. Further, if multilevel DWT coefficients are used as an input to the Bi-LSTM encoders, then the encoded representation obtained is best suited to regress the value of RUL by using it as an input to the multi-layer feed-forward network.

The invention claimed is:

1. A computer-implemented system for predicting a remaining useful life (RUL) of a machine component, comprising:
a data service configured to receive time series sensor data, wherein the data service comprises a data pre-processing service configured for data preparation;
a model training and deployment service configured to store the pre-processed data in a distributed database and train a neural network model, wherein the model training and deployment service comprises a RUL calculator and evidence miner service configured to query data from the distributed database and persist the trained neural network model in a model versions database; and
a user interface service configured to communicate on a dashboard over a communication network;
wherein the system is configured to
receive, via the data service, a first time series sensor data from historical run-to-failure instances collected from a plurality of sensors or manufacturing execution system;
normalize, via the data pre-processing service, the first time series sensor data with a statistical cluster-based algorithm to generate normalized data;
transform, via the data pre-processing service, the normalized data with multilevel discrete wavelet transform (DWT) to generate a transformed time series sub-sequence data in frequency domain;
input the transformed time series sub-sequence data to the model training and deployment service;
train, via the model training and deployment service, a neural network predictive model for predicting the RUL of the machine component;
optimize the trained neural network predictive model with an optimization algorithm to update network weights iterative based on training data;
predict the RUL of the machine component by mapping a second time series data collected from an on-line instance to degradation patterns built in the historical run-to-failure instances using the trained predictive model; and
display, via the user interface service, the RUL of the machine component on a dashboard.

2. The system of claim 1, wherein the data pre-processing service uses a feature engineering script to prepare the transformed time series sub-sequences data in frequency domain.

3. The system of claim 1, wherein the neural network predictive model comprises a bidirectional long short-term memory (BiLSTM) based autoencoder neural network.

4. The system of claim 1, wherein the neural network predictive model comprises an unsupervised predictive GAN neural network with multi-layer perceptrons (MLP) as generator and discriminator (MLP-MLP GAN).

5. The system of claim 1, wherein the optimization algorithm comprises adaptive moment estimation optimization algorithm.

6. A computer-implemented method for predicting a remaining useful life (RUL) of a machine component, comprising:
receiving, via a data service, a first time series sensor data from historical run-to-failure instances collected from a plurality of sensors or manufacturing execution system;
normalizing, via a data pre-processing service, the first time series sensor data with a statistical cluster-based algorithm to generate normalized data;
transforming, via the data pre-processing service, the normalized data with multilevel discrete wavelet transform (DWT) to generate a transformed time series sub-sequence data in frequency domain;
input the transformed time series sub-sequence data to a model training and deployment service;
training, via the model training and deployment service, a neural network predictive model for predicting the RUL of the machine component;

optimizing the trained neural network predictive model with an optimization algorithm to update network weights iterative based on training data;

predicting the RUL of the machine component by mapping a second time series data collected from an on-line instance to degradation patterns built in the historical run-to-failure instances using the trained predictive model; and displaying, via a user interface service, the RUL of the machine component on a dashboard.

7. The method of claim 6, wherein the data pre-processing service uses a feature engineering script to prepare the transformed time series sub-sequences data in frequency domain.

8. The method of claim 6, wherein t wherein the neural network predictive model comprises a bidirectional long short-term memory (BiLSTM) based autoencoder neural network.

9. The method of claim 6, wherein the neural network predictive model comprises an unsupervised predictive GAN neural network with multi-layer perceptrons (MLP) as generator and discriminator (MLP-MLP GAN).

10. The method of claim 6, wherein the optimization algorithm comprises adaptive moment estimation optimization algorithm.

* * * * *